United States Patent
Xu et al.

(10) Patent No.: US 10,820,518 B2
(45) Date of Patent: Nov. 3, 2020

(54) SELF-ADAPTIVE THROWING DEVICE FOR STALKS CUTTING AND DISCHARGING IN THE LONGITUDINAL AXIAL FLOW COMBINE HARVESTERS AND ITS CONTROL METHOD

(71) Applicant: JIANGSU UNIVERSITY, Jiangsu (CN)

(72) Inventors: Lizhang Xu, Jiangsu (CN); Yang Li, Jiangsu (CN); Yaoming Li, Jiangsu (CN)

(73) Assignee: Jiangsu University, Jiangsu (CN)

( * ) Notice: Subject to any disclaimer, the term of this patent is extended or adjusted under 35 U.S.C. 154(b) by 343 days.

(21) Appl. No.: 15/742,368

(22) PCT Filed: Nov. 22, 2016

(86) PCT No.: PCT/CN2016/106705
§ 371 (c)(1),
(2) Date: Jan. 5, 2018

(87) PCT Pub. No.: WO2018/076428
PCT Pub. Date: May 3, 2018

(65) Prior Publication Data
US 2020/0077591 A1    Mar. 12, 2020

(30) Foreign Application Priority Data
Oct. 25, 2016   (CN) .......................... 2016 1 0950735

(51) Int. Cl.
*A01F 12/40*    (2006.01)
*A01D 41/12*    (2006.01)
(Continued)

(52) U.S. Cl.
CPC .......... *A01F 12/40* (2013.01); *A01D 41/1243* (2013.01); *A01D 41/06* (2013.01);
(Continued)

(58) Field of Classification Search
CPC ........ A01F 12/40; A01F 12/446; A01F 12/22; A01F 12/60; A01D 41/1243; A01D 41/06; A01D 41/127
See application file for complete search history.

(56) References Cited

U.S. PATENT DOCUMENTS

| | | | | |
|---|---|---|---|---|
| 4,177,820 A | * | 12/1979 | Rowland-Hill | A01F 7/06 460/66 |
| 4,254,780 A | * | 3/1981 | Powell | A01F 7/06 460/66 |

(Continued)

FOREIGN PATENT DOCUMENTS

| | | |
|---|---|---|
| CN | 202857316 U | 4/2013 |
| CN | 104221585 A | 12/2014 |

(Continued)

OTHER PUBLICATIONS

English Translation of the Written Opinion of the International Searching Authority of WO2018076428, [retrieved on Mar. 24, 2020] . Retrieved from: Patentscope in WIPO IP Portal. (Year: 2019).*

*Primary Examiner* — Thomas B Will
*Assistant Examiner* — Joan D Misa
(74) *Attorney, Agent, or Firm* — Greenberg Traurig, LLP

(57) ABSTRACT

A self-adaptive throwing device for stalks cutting and discharging in the longitudinal axial flow combine harvesters comprises a longitudinal axial flow stalk discharging and guiding device, a stalks remnant shredding device, a wind direction and wind speed detection device, a reaping region identification device, an operating speed sensor, a shredding revolution speed sensor, a width adjustable throwing device, a self-adaptive throwing real-time control system. The throwing width is self-adaptive based on the machine operating speed, wind speed, wind direction, the position of the region having been cut and the region waiting to be cut, so (Continued)

as to achieve the full width throwing of the stalks remnant. An arc stalk guiding plate and a flow separating bar are mounted in the longitudinal axial flow stalk guiding device to make the shredding load more even.

7 Claims, 5 Drawing Sheets

(51) Int. Cl.
  *A01D 41/06* (2006.01)
  *A01D 41/127* (2006.01)
  *A01F 12/22* (2006.01)
  *A01F 12/44* (2006.01)
  *A01F 12/60* (2006.01)
(52) U.S. Cl.
  CPC ............ *A01D 41/127* (2013.01); *A01F 12/22* (2013.01); *A01F 12/446* (2013.01); *A01F 12/60* (2013.01)

(56) References Cited

U.S. PATENT DOCUMENTS

| | | | | |
|---|---|---|---|---|
| 5,488,817 | A * | 2/1996 | Paquet | A01D 41/127 56/10.2 R |
| 5,524,424 | A * | 6/1996 | Halgrimson | A01D 41/127 56/10.2 A |
| 5,569,081 | A * | 10/1996 | Baumgarten | A01D 41/1243 460/1 |
| 5,995,894 | A * | 11/1999 | Wendte | A01D 41/127 701/1 |
| 5,995,895 | A * | 11/1999 | Watt | A01D 75/28 701/50 |
| 6,152,820 | A * | 11/2000 | Heidjann | A01F 12/40 460/112 |
| 6,241,605 | B1 * | 6/2001 | Pfeiffer | A01F 7/06 460/112 |
| 7,306,174 | B2 * | 12/2007 | Pearson | A01D 41/1243 239/663 |
| 7,473,169 | B2 * | 1/2009 | Isaac | A01F 7/067 460/80 |
| 7,485,035 | B1 * | 2/2009 | Yde | A01D 41/1243 460/111 |
| 7,487,024 | B2 * | 2/2009 | Farley | A01D 41/1243 701/50 |
| 7,648,413 | B2 * | 1/2010 | Duquesne | A01D 41/127 460/112 |
| 7,731,576 | B2 * | 6/2010 | Isaac | A01F 7/067 460/84 |
| 7,756,624 | B2 * | 7/2010 | Diekhans | A01B 69/007 701/50 |
| 8,010,262 | B2 * | 8/2011 | Schroeder | A01D 41/1243 701/50 |
| 8,961,284 | B2 * | 2/2015 | Wagner | A01D 41/1243 460/112 |
| 9,220,195 | B2 * | 12/2015 | Eggenhaus | A01D 41/1243 |
| 9,516,812 | B2 * | 12/2016 | Baumgarten | A01D 41/1243 |
| 9,699,967 | B2 * | 7/2017 | Palla | G01P 13/02 |
| 9,788,480 | B2 * | 10/2017 | Nafziger | A01D 34/008 |
| 9,801,339 | B2 * | 10/2017 | Roberge | A01D 41/1243 |
| 9,872,433 | B2 * | 1/2018 | Acheson | A01D 41/127 |
| 9,934,538 | B2 * | 4/2018 | Hunt | H04L 67/12 |
| 9,949,434 | B2 * | 4/2018 | Baes | A01D 41/1243 |
| 9,974,232 | B2 * | 5/2018 | Shane | A01D 41/127 |
| 10,143,131 | B2 * | 12/2018 | Isaac | A01D 41/127 |
| 10,212,882 | B2 * | 2/2019 | Mayerle | A01F 12/10 |
| 10,356,980 | B2 * | 7/2019 | Rotole | A01D 45/30 |
| 10,362,732 | B2 * | 7/2019 | Baumgarten | A01D 41/127 |
| 10,426,093 | B2 * | 10/2019 | Isaac | A01F 7/067 |
| 10,470,366 | B2 * | 11/2019 | Mahieu | G01S 13/88 |
| 2013/0095899 | A1 * | 4/2013 | Knapp | A01D 41/127 460/111 |
| 2017/0086373 | A1 * | 3/2017 | Mahieu | A01D 41/127 |
| 2018/0084718 | A1 * | 3/2018 | Baumgarten | A01D 41/1271 |
| 2018/0310474 | A1 * | 11/2018 | Posselius | A01D 41/127 |
| 2019/0335661 | A1 * | 11/2019 | Seiders, Jr. | A01D 41/141 |

FOREIGN PATENT DOCUMENTS

| | | |
|---|---|---|
| CN | 205030180 U | 2/2016 |
| CN | 105432242 A | 3/2016 |
| CN | 205105683 U | 3/2016 |
| CN | 205408582 U | 8/2016 |
| EP | 0685151 A1 | 12/1995 |
| EP | 2689655 B1 | 11/2015 |
| EP | 2382853 B1 | 4/2016 |

\* cited by examiner

SELF-ADAPTIVE THROWING DEVICE FOR STALKS CUTTING AND DISCHARGING IN THE LONGITUDINAL AXIAL FLOW COMBINE HARVESTERS AND ITS CONTROL METHOD

CROSS REFERENCE TO RELATED APPLICATION

The present application is a 371 U.S. National Stage of International Application No. PCT/CN2016/106705, filed Nov. 22, 2016, which claims the benefit of the earlier filing date of Chinese Patent Application No. 201610950735.X filed on Oct. 25, 2016, which are each incorporated herein by reference in their entirety.

FIELD OF THE DISCLOSURE

The invention belongs to the technical field of agricultural equipment and relates to a combine harvester, and in particular to a self-adaptive throwing device for stalks cutting and discharging in the longitudinal axial flow combine harvesters and its control method.

BACKGROUND OF RELATED ART

The present combine harvesters need to be equipped with straw crushing and throwing device during work, its function is discharging debris such as the stalks generated after the threshing and throwing it out of the machine after being crushed through the crushing and throwing device, and thus, evenly covering the field. On the one hand, the device can crush stalks. Farmers do not need to collect and burn it, and thus labor cost is decreased and environmental pollution is avoided; on the other hand, after being crushed and thrown into the field, the stalks can directly permeate into the soil as a fertilizer and enhance the fertility of soil and play a role in increasing output of crop.

China National Patent CN2050301413U publishes a new type of longitudinal axial combine straw smash machine, which designed a new type of blade structure and fan-assisted structure, the primary and secondary cutter shafts utilize local multiple-spiral design, solving the problems of traditional longitudinal axial smash machine, such as winding grass on fixed knife blade, missing cut, etc., and it has features such as wide throwing width, high-security. However, the structure of the machine is more complex, the space for discharging stalks is smaller, and it cannot meet the requirement of the combined harvester with a large feeding amount in the aspect of shredding and throwing the discharged stalks.

China patent CN2040314130U publishes a grass chopper adapted for a self-propelled combine harvester, which is mounted at the stalks discharging outlet of the combine harvesters and a guide plate is provided in the grass chopper to uniformly disperse the chopped straw in the ground. However, when the stalks discharged from the threshing drum enter the grass chopper, the flow direction of the stalks is concentrated in one place and the stalks cannot be effectively spread, the local load on the chopper is too large, reducing the efficiency of crushing and throwing. Moreover, the inclination of the guide plate cannot be adjusted adaptively.

China patent CN2051356144U publishes a new type of straw grinder suitable for full feed-type combine harvester with its active blade staggered with the driven blade, and the driving shaft is connected with the power transmission shaft drive of the combine harvesters. This kind of machine is simple in structure and has lower power consumption. However, since there is no stalks guide board, crushed stalks are note evenly distributed at the discharging opening of this kind of machine and diffusion is not achieved, the effect is not ideal.

In addition to the technical shortcomings described above, the above-mentioned patent cannot achieve the shredding and full-width dispel version of the mismatches discharged from the end surface of the shredded shaker of the combine harvesters.

What is more, with the formation of large-scale grain production in family farms of our country and the expansion of the acreage of high-yielding crops gradually, the combine requirements under the large feed volume and the full width and width are put forward. The processing capacity and capacity of the traditional straw crushing and dispensing device used in the existing market do not match the harvest flow rate of the large feed, and the effect of the crushing and scattering of the stalk is not satisfactory.

SUMMARY

To solve the technical shortcomings of the above-mentioned stalks crushing and throwing device for discharged stalks, self-adaptive throwing device for stalks cutting and discharging in the longitudinal axial flow combine harvesters and its control system with an large feed quantity is provided to meet the requirements of cutting and throwing stalks at a feeding speed of 5 to 14 kg/s of the combine harvester. Moreover, the structure is compact, stalks after threshing and the remnant screened by the sieve surface can be effectively crushed and thrown. The device provided in the present invention has the advantages of large stalks discharging space, high crushing efficiency, evenly throwing and adaptive throwing width adjustment.

The technical scheme adopted by the invention is as follows:

Self-adaptive throwing device for stalks cutting and discharging in the longitudinal axial flow combine harvesters, comprising a longitudinal axial flow stalks discharging and guiding device, a stalks remnant shredding device, a wind direction and wind speed detection device, a reaping region identification device, an operating speed sensor, a shredding revolution speed sensor, a width adjustable throwing device, a self-adaptive throwing real-time control system.

The stalks remnant shredding device is located behind and below the longitudinal axial flow stalks discharging and guiding device, and the width adjustable throwing device is mounted on a stalks discharging side behind the stalks remnant shredding device. The wind direction and wind speed detection device is installed in an intermediate area above a combine harvester grain tank, and the wind speed and the wind direction at the position where the machine works can be measured without being blocked by other components. The reaping region identification device is mounted above the combine harvester grain tank, the detection range of the reaping region identification device is larger than the width of the header of the combine harvester. The operating speed sensor is mounted on a driving wheel of the combine harvester; the shredding revolution speed sensor is mounted on a cutter shaft of the stalks remnant shredding device.

The width adjustable throwing device includes a servo electric cylinder and a throwing-width adjusting mechanism, the servo electric cylinder and the throwing-width adjusting mechanism are mounted on the outside of a housing of the throwing device. The input of the servo electric cylinder is connected with the self-adaptive throwing real-time control system, and the output of the servo electric cylinder is connected with a throwing-width adjusting mechanism. The throwing-width adjusting mechanism includes a stalk throwing and guiding plate, a first connecting rod, a second connecting rod, a third connecting rod, a middle connecting plate, a supporting rod, a first movable pin roll, a second movable pin roll and a third movable pin roll. The stalk throwing and guiding plate are evenly distributed over the lateral width of the housing of the throwing device and the front end of the stalk throwing and guiding plate is in hinge connection with the housing of throwing device, the rear end of the stalk throwing and guiding plate is in hinge connection with the first connecting rod, the rear end of the stalk throwing and guiding plate can be rotated about the hinge at the front end. The first connecting rod is connected to the middle connecting plate via the first movable pin roll, one end of the second connecting rod is connected to one end of the third connecting rod through the third movable pin roll, and the other end of the second connecting rod is connected to the middle connecting plate via the second movable pin roll, the other end of the third connecting rod is fixed to the rod end joint on the servo electric cylinder shaft, the middle connecting plate is mounted on the supporting rod. The supporting rod is an L-shaped rod, and the middle connecting plate is rotatable about the upper arm of the supporting rod, and the lower arm of the supporting rod is fixed to the side of the housing of the throwing device.

The wind direction and wind speed detection device is used to detect the wind direction and the wind speed in real time at the position where the machine works and transmit the measured wind direction and the wind speed data to the self-adaptive throwing real-time control system.

The reaping region identification device comprises a CCD camera, an image processing unit and a signal output interface, the image recognition range of the CCD camera is larger than the width of the header of the combine harvester, and the CCD camera is used for continuously capturing the images on both sides of the header in the heading direction of the combine harvester. The captured images on both sides of the header are performed feature extraction by the image processing unit. According to the different morphological features, including the feature of the standing upright and neatly arranged crops in the region waiting to be cut and the feature of evenly distributed stalks on the low stubble in the region having been cut, the left side and the right side of the heading direction of the combine harvester are recognized as the region waiting to be cut or the region having been cut, and then it is converted into a control signal, transmitted to the adaptive throwing real-time control system.

The operating speed sensor is used for real-time measuring the advancing speed of the machine according to the rotational speed of the driving wheel of the combine harvester and the operating speed parameter is transmitted to the self-adaptive throwing real-time control system.

The shredding revolution speed sensor is used for real-time measurement of the rotational speed of the cutter shaft of the shredder, the short stalk throwing speed is obtained, and the short stalk throwing speed parameter is online transmitted to the self-adaptive throwing real-time control system.

The self-adaptive throwing real-time control system takes the parameters including the wind direction value, the wind speed value, the machine working speed, the short stalk throwing speed, and the stalks remnant throwing angle as the independent variables to carry out the velocity synthesis of the throwing stalks remnant so as to obtain the velocity components of the stalks remnant in the width direction and the vertical direction, and the real-time throwing trajectory of the stalks remnant in the width section is obtained by combining with gravity. The self-adaptive throwing real-time control system takes the advancing direction of the machine, the position parameters of the region waiting to be cut and the region having been cut as the independent variables so as to calculate the width required to throw the stalks remnant in real time. According to the real-time throwing trajectory of the stalks remnant and the real-time throwing width required for the stalks remnant, the self-adaptive throwing real-time control system calculates the actual adjustment parameters of the servo electric cylinder by utilizing the fuzzy theory, and then control the servo electric cylinder to drive the throwing-width adjusting mechanism, thus changing the inclination of the stalk throwing and guiding plate, so as to achieve the full width throwing of the stalk remnant.

Furthermore, the number of the throwing-width adjusting mechanism is 2 to 6, and the number of the servo electric cylinder is 2 to 6, and the number of the stalks throwing and guiding plate included in each throwing-width adjusting mechanism is 1-3.

Furthermore, the longitudinal axial flow stalks discharging and guiding device comprises a longitudinal axial flow threshing cylinder, a longitudinal axial flow cylinder top cover, a longitudinal axial flow top cover stalk-guiding plate, a concave sieve, a stalk baffle, an arc stalk guiding plate, shunt bars; the longitudinal axial flow cylinder top cover is located over the longitudinal axial flow threshing cylinder, the longitudinal axial flow top cover stalk-guiding plate is mounted to the inner wall of the longitudinal axial flow cylinder top cover, and the bottom edge of the longitudinal axial flow top cover stalk-guiding plate is spaced from the outermost edge of the longitudinal axial flow threshing cylinder by 10 mm to 130 mm, and the concave sieve is mounted below the longitudinal axial flow threshing cylinder. The central axis of concave sieve is coincide with the axis of the longitudinal axial flow threshing cylinder, and the gap between the longitudinal axial flow threshing cylinder and the concave sieve is 10 mm to 60 mm, and the stalk baffle is mounted in the tail of the concave sieve, the width of the stalk discharging opening formed by the stalk baffle and the tail of longitudinal axial flow threshing cylinder is 200 mm to 400 mm. The arc stalk guiding plate is located at the inner of the stalk discharging opening, which is an arc plate formed by two flat plates and three curved plates; the first plane is fixed on the stalk baffle, the first curved surface, the second curved surface and the third curved surface are arranged side by side, and the side edges are successively connected, and the two flow separating bars are respectively fixed to a junction between the first curved surface and the second curved surface, and a junction between the second curved surface and the third curved surface; the top ends of the first curved surface, the second curved surface and the third curved surface are in the same horizontal line and are fixed on the side wall of the stalk discharging opening, the tail ends of the first curved surface, the second curved surface and the third curved surface are in the same horizontal line parallel to the transverse direction of the stalks remnant mashing device and are connected to the leftmost side of the stalks remnant mashing device. The angle between the horizontal line in which the top ends of the three curved surfaces are located and the horizontal line in which the tails ends of the three curved surfaces are located is 90°. The second plane is located behind and below the third curved surface, the lateral width formed by the tail end of the second plane and the tail ends of the three curved surface approximately equals to the lateral width of the stalks remnant shredding device.

Furthermore, the number of the longitudinal axial flow top cover stalk-guiding plate is 4-6, the installation direction of the guide plate for the longitudinal axial flow top cover is oriented towards the stalk discharging opening, that is, keeping in line with the direction of the stalk flow, and the angle between the plane formed by connecting the top and the tail of the guide plate for the longitudinal axial flow top cover and the axis of the longitudinal axial flow threshing cylinder is 5°-20°.

Furthermore, the stalks remnant shredding device includes the upper cover of shredder, the shredder and the shredder baseplate. The axis of the cutter shaft of the shredder is located at a distance of 0 mm to 200 mm below the upper sieve surface of the cleaning device. The horizontal distance between the cutter shaft of the shredder and the innermost of the stalk discharging opening is 240 mm to 600 mm; the upper end of the upper cover of the shredder is connected with the outermost side of the stalk discharging opening, the lower end of the upper cover of shredder is connected with the shredder. A stalk containing space of about 0.25 m$^3$ is formed among the upper cover of shredder, the arc stalk guiding plate, and the shredder baseboard.

Furthermore, the shredder baseboard is located at a distance of 0 mm to 130 mm below the upper sieve surface of the cleaning device.

An adaptive throwing real-time control method for the self-adaptive throwing device for stalks cutting and discharging in the longitudinal axial flow combine harvesters, comprising the following steps:

(1) During the operation of the combine harvester, the adaptive throwing real-time control system obtains the wind direction value and the wind speed value at the position where the machine works through the wind direction and wind speed detection device, obtains the machine working speed through the operating speed sensor, obtains the short stem throwing speed in real time through the shredding revolution speed sensor (10), obtains the stalk remnant throwing angle in real time by conversion of the displacement of the servo electric cylinder, and obtains the advancing direction of the machine and the position information of the region waiting to be cut and the region having been cut through the reaping region identification device so as to characterize the operation status of the self-adaptive throwing device for stalks cutting and discharging.

(2) The self-adaptive throwing real-time control system performs pre-processing to the obtained real-time parameters, which mainly includes suppressing the interference, improving the signal-to-noise ratio and completing the missing data to eliminate the influence of random and uncertain factors on the subsequent data analysis.

(3) The self-adaptive throwing real-time control system takes the parameters including the wind direction value, the wind speed value, the machine working speed, the short stem throwing speed, and the stalks remnant throwing angle as the independent variables to carry out the velocity synthesis of the throwing stalks remnant so as to obtain the velocity components of the stalks remnant in the width direction and the vertical direction, and the real-time throwing trajectory of the stalks remnant in the width section is obtained by the combination with gravity. The self-adaptive throwing real-time control system takes the machine's advancing direction, the position parameter of the region waiting to be cut and the region having been cut as independent variables so as to calculate the width required to throw the stalks remnant in real time.

(4) According to the real-time throwing trajectory of the stalks remnant and the real-time throwing width required for the stalks remnant, the self-adaptive throwing real-time control system calculates the actual adjustment parameters of the servo electric cylinder by utilizing the fuzzy control theory and then control the servo electric cylinder to drive the throwing-width adjusting mechanism, thus changing the inclination of the stalk throwing and guiding plate, so as to achieve the full width throwing of the stalk remnant.

In summary, the throwing width of the invention is self-adaptively adjustable according to the parameters such as the machine working speed, wind speed, wind direction, the position of the region having been cut and the position of the region waiting to be cut so as to realize the full width throwing of the stalks remnant. The shredded stems are uniformly scattered in the field, and it is also possible to avoid the scattering of the stem to the region waiting to be cut. The present invention has a good adaptability to the large feed amount of the combined harvester, and can meet the requirement for cutting and throwing stalks of longitudinal axis flow combine harvester in the feeding amount of 5 kg to 14 kg.

In addition, according to the invention, the arc stalk guiding plate and the flow separating bar are arranged at stalk discharging opening, and the stalks are separated into three stalk strips after the diversion function of the arc stalk guiding plate and the flow separating bar; after diversion, the transverse width of the stalk strip is approximately equal to the lateral width of the inlet of the stalk remnant shredding device, so that the crushing load of the stalks remnant shredding device is relatively uniform. The stalk containing space between the traditional stalks discharging and throwing device and the longitudinal axial flow cylinder is small, and in the case of large feeding amount, the amount of discharged stalks and broken spikes has also greatly increased, blockage is prone to occurring. While in the present invention, the shredder is lowered, increasing the stalks containing space so as to solve the problems such as unsmooth stalk discharging and blockage of the shredder caused by instantaneous excessive stalk discharging of longitudinal axial flow threshing cylinder.

By lowering the position of the shredder, the remnant screened by the upper sieved surface of the cleaning device can also be entered into the shredder, where the remnant and the stalks are simultaneously smashed and thrown; moreover, the air flow formed by the rotation of the blade enhanced the speed of the air flow on the tail of the upper sieve surface of the cleaning device, which is beneficial to the remnant discharge at the end of the upper sieve surface and improvement of the cleaning performance.

1. Header of the combine harvester; 2. Reaping region identification device; 3. Combine harvester grain tank; 4. Wind direction and wind speed detection device; 5. Longitudinal axials flow stalk discharging and guiding device; 6. Stalk discharging opening; 7. Upper cover of shredder; 8. Operating speed sensor; 9. Upper sieve surface of the cleaning device; 10. Shredding revolution speed sensor; 11. Stalks remnant shredding device; 12. Shredder baseboard; 13. Width adjustable throwing device; 201. Region waiting to be cut; 202. Region having been cut; 501. Longitudinal axial flow cylinder top cover; 502. Longitudinal axial flow top cover stalk-guiding plate; 503. Longitudinal axial flow threshing cylinder; 504. Concave sieve; 505. Stalk baffle; 506. Arc Stalk guiding plate; 507. Flow separating bars; 1101. Shredder; 1301. Servo electric cylinder; 1302. Throwing-width adjusting mechanism; 506-1. The first plane; 506-2. The first curved surface; 506-3. The second curved surface; 506-4. The third curved surface; 506-5. The second plane; 1302-1. The third connecting rod; 1302-2. The third movable pin roll; 1302-3. The second connecting rod; 1302-4. The second movable pin roll; 1302-5. Middle connecting plate; 1302-6. The first movable pin roll; 1302-7. Supporting rod; 1302-8. The first connecting rod; 1302-9. Stalk throwing and guiding plate; 1302-10. Throwing device housing.

DETAILED DESCRIPTION

The present invention will now be described further with reference to the accompanying drawings and specific examples, but the scope of the present invention is not limited thereto.

Figure 1:
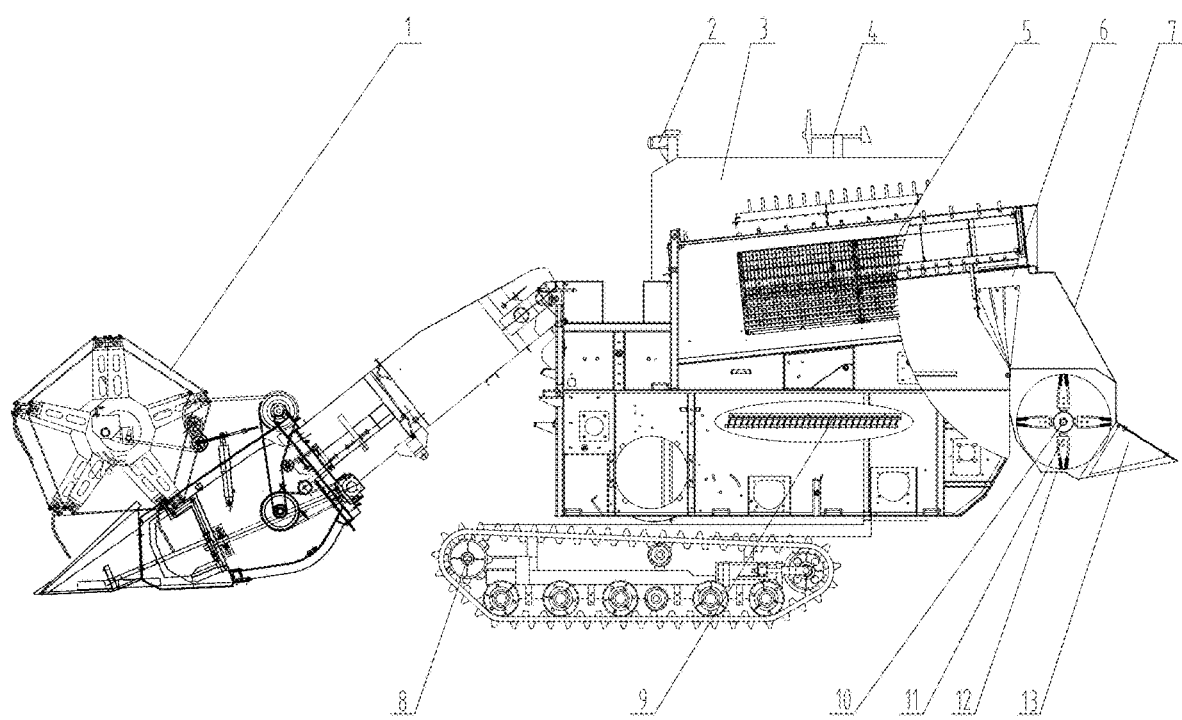
FIG. 1 is a schematic left side view of the structure of the self-adaptive throwing device for stalks cutting and discharging in the longitudinal axial flow combine harvesters.

FIG. 1 shows the schematic left side view of the structure of the self-adaptive throwing device for stalks cutting and discharging in the longitudinal axial flow combine harvesters, the self-adaptive throwing device for stalks cutting and discharging in the longitudinal axial flow combine harvesters, comprising a longitudinal axial flow stalks discharging and guiding device 5, a stalks remnant shredding device 11, a wind direction and wind speed detection device 4, a reap region identification device 2, an operating speed sensor 8, a shredding revolution speed sensor 10, a width adjustable throwing device 13, and self-adaptive throwing real-time control system. The stalks remnant shredding device 11 is located behind and below the longitudinal axial flow stalks discharging and guiding device 5, and the width adjustable throwing device 13 is mounted on a stalks discharging side behind the stalk remnant shredding device 11. The wind direction and wind speed detection device 4 is installed in a middle area above the combine harvester grain tank 3, and the wind speed and the wind direction at the position where the machine works can be measured without being blocked by other components. The reaping region identification device 2 is mounted above the combine harvester grain tank, adjacent to the outside of the combine harvester grain tank 3. The detection range of the reaping region identification device 2 is larger than the width of the header 1 of the combine harvester. The operating speed sensor 8 is mounted on the driving wheel of the combine harvester; the shredding revolution speed sensor 10 is mounted on the cutter shaft of the stalks remnant shredding device 11. The stalks after the threshing process are diverted and diffused in the longitudinal axial flow stalks discharging and guiding device 5 and discharged evenly into the stalks remnant shredding device 11 and then pulverized into the width adjustable throwing device 13, finally thrown to the field. The wind direction and wind speed detecting device 4, the reaping region identification device 2, the operating speed sensor 8, and the shredding revolution speed sensor 10 transmit the measured parameters online to the self-adaptive throwing real-time control system. After being processed by the self-adaptive throwing real-time control system, the parameters can be used to control the width adjustable throwing device 13, thereby realizing the self-adaptive adjustment of the throwing width.

Figure 2:
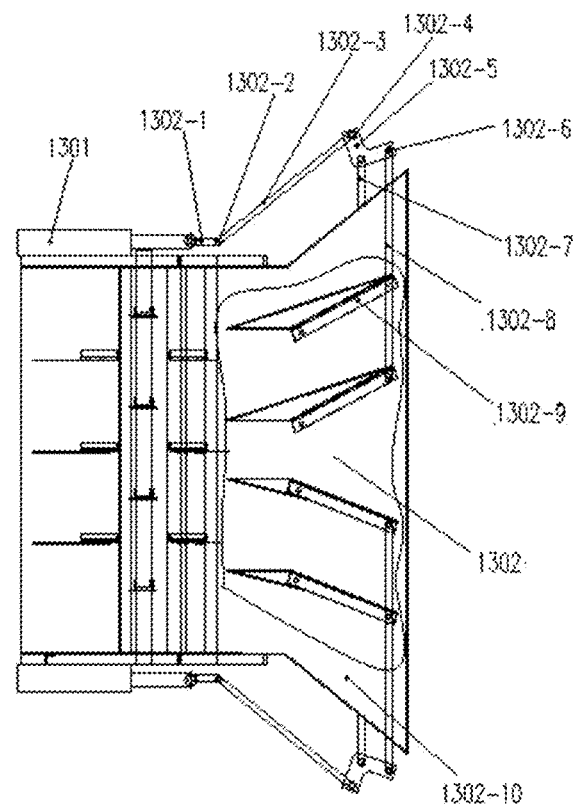
FIG. 2 is a schematic top plan view of the width adjustable throwing device.

FIG. 2 shows a schematic top plan view of the width adjustable throwing device. The width adjustable throwing device includes a servo electric cylinder 1301, a throwing-width adjusting mechanism 1302. The servo motor cylinder 1301 and the throwing-width adjusting mechanism 1302 are mounted on the outside of the throwing device housing 1302-10, the input end of the servo motor cylinder 1301 is connected to the self-adaptive throwing real-time control system, the output end of the servo motor cylinder 1301 is connected with the throwing-width adjustment mechanism 1302. The throwing-width adjusting mechanism 1302 is composed of a stalk throwing and guiding plate 1302-9, a first connecting rod 1302-8, a second connecting rod 1302-3, a third connecting rod 1302-1, a middle connecting plate 1302-5, a supporting rod 1302-7, a first movable pin roll 1302-6, a second movable pin roll 1302-4, and a third movable pin roll 1302-2. The servo electric cylinder 1301 is mounted on the outside of the throwing device housing 1302-10, and the stalk throwing and guiding plate 1302-9 is evenly distributed over the lateral width of the throwing device housing 1302-10, and the front end of the stalk throwing and guiding plate 1302-9 is in hinge connection with the throwing device housing 1302-10. The rear end of the stalk throwing and guiding plate 1302-9 is mounted on the first connecting rod 1302-8 and the rear end of the stalk throwing and guiding plate 1302-9 is rotatable about the hinge at the front end, and the stalk throwing and guiding plate 1302-9 is also in hinge connection with the first connecting rod 1302-8. The first connecting rod 1302-8 is connected to the middle connecting plate 1302-5 through the first movable pin roll 1302-6. One end of the second connecting rod 1302-3 is connected with one end of the third connecting rod 1302-1 through the third movable pin roll 1302-2. The other end of the second connecting rod 1302-3 is connected to the middle connecting plate 1302-5 through the second movable pin roll 1302-4, and the other end of the third connecting rod 1302-1 is fixed to the rod-end joint in the shaft of the servo motor cylinder 1301. The middle connecting plate 1302-5 is mounted on the supporting rod 1302-7, the supporting rod 1302-7 is an L-shaped rod, and the middle connecting plate 1302-5 is capable of rotating about the upper arm of the supporting rod 1302-7 and the lower arm of the supporting rod 1302-7 is fixed to the side of the throwing device housing 1302-10. The number of the throwing-width adjusting mechanism 1302 is two, and accordingly, the number of the servo motor cylinders 1301 is two, and the number of the stalk throwing and guiding plate 1302-9 included in each throwing-width adjusting mechanism 1302 is two, that is, the inclination angle of the two stalk throwing and guiding plates 1302-9 can be individually adjusted through controlling the throwing-width adjusting mechanism 1302 by the servo motor cylinder 1301 on the left side. The inclination angle of the two stalk throwing and guiding plates 1302-9 on the right side can be individually adjusted through controlling the throwing-width adjusting mechanism 1302 by the servo motor cylinder 1301 on the right side. The self-adaptive throwing real-time control system can control the servo motor cylinders 1301 on the left side and right side to move linearly, so as to respectively complete the adjustment of the inclination angle of the stalk throwing and guiding plate 1302-9 on the left side and right side, thereby achieving the purpose of adjusting the throwing width.

Figure 3:
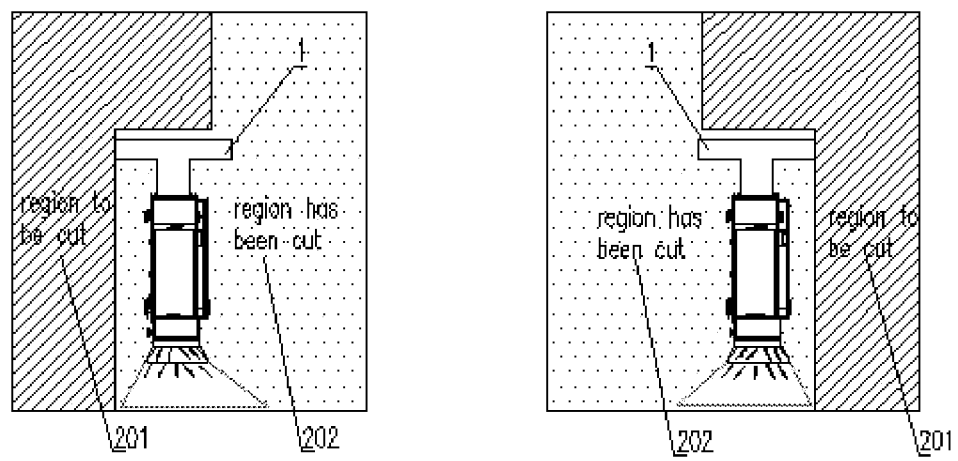
FIG. 3 is a schematic diagram of the working conditions of the self-adaptive throwing device for stalks cutting and discharging in the longitudinal axial flow combine harvesters.

FIG. 3 shows a schematic diagram of the working conditions of the self-adaptive throwing device for stalks cutting and discharging in the longitudinal axial flow combine harvesters. When the left side of the combine harvester's advancing direction the region to be cut 201 and the right side of the combine harvester's advancing direction is the region having been cut 202, the self-adaptive throwing real-time control system controls the servo motor cylinders 1301 on the left side and right side of the width adjustable throwing device 13 to move respectively, making the inclination angle of the two stalk throwing and guiding plates 1302-9 on the left side slightly tilt to the left and the inclination angle of the two stalk throwing and guiding plates 1302-9 on the right side tilt significantly to the right, so that the stalks remnant cannot be thrown to the crop in the region to be cut 201 to prevent the grain from falling off; at the same time, the throwing width is spread as far as possible to the region having been cut 202, which facilitates the uniform tiling of the smashed stem and the remnant in the field.

Figure 7:
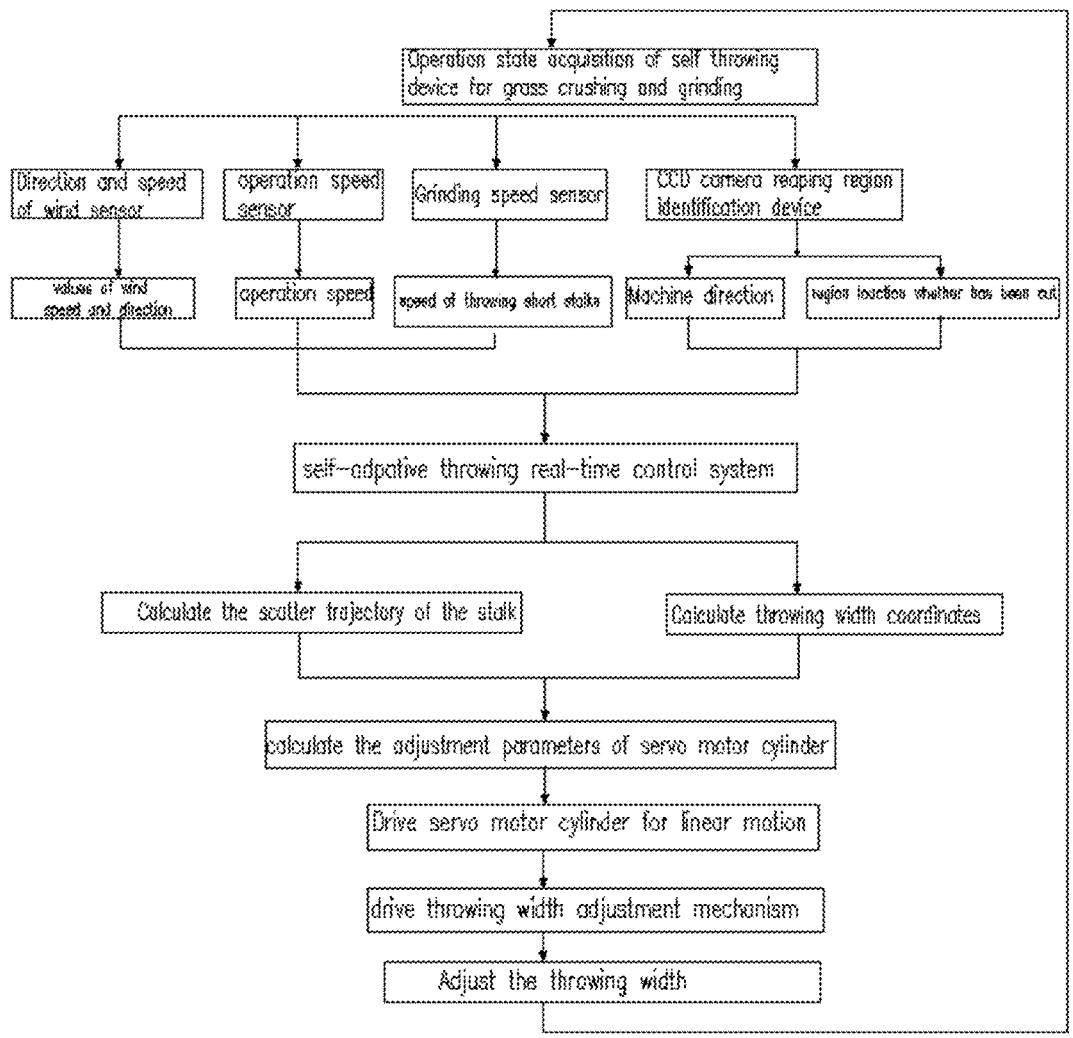
FIG. 7 is a flow chart showing the operation of the self-adaptive throwing device for stalks cutting and discharging in the longitudinal axial flow combine harvesters.

FIG. 7 shows the flow chart showing the operation of the self-adaptive throwing device for stalks cutting and discharging in the longitudinal axial flow combine harvesters. When the combine harvester performs the harvesting operation, the self-adaptive throwing real-time control system obtains the wind direction value and the wind speed value at the position where the machine works in real time through the wind direction and wind speed detection device 4, obtains the machine working speed in real time through the operating speed sensor 8, and obtains the short stem throwing speed in real time through the shredding revolution speed sensor 10, obtains the parameters such as the machine advancing direction, the position information of the region waiting to be cut 201, and the position information of the region having been cut 202 in real time through the reaping region identification device 2 to indicate the working state of the self-adaptive throwing device for stalks cutting and discharging. The self-adaptive throwing real-time control system pre-possesses the obtained real-time parameters, which mainly includes suppressing the interference, improving the signal-to-noise ratio and completing the missing data to eliminate the influence of random and uncertain factors on the subsequent data analysis. The self-adaptive throwing real-time control system takes the parameters including the wind direction value, wind speed value, machine's working speed and short stem throwing speed as independent variables to carry out the velocity synthesis of the throwing stalks so as to obtain the velocity components of the stalks remnant in the width direction and the vertical direction, and the real-time throwing trajectory of the stalks remnant in the width section is obtained by the combination with gravity. The self-adaptive throwing real-time control system takes the advancing direction of the machine, the position parameters of the region waiting to be cut 201 and the region having been cut 202 as the independent variables so as to calculate the width required to throw the stalks remnant in real time. According to the real-time throwing trajectory of the stalks remnant and the real-time throwing width required for the stalks remnant, the self-adaptive throwing real-time control system calculates the actual adjustment parameters of the servo electric cylinder by utilizing the fuzzy theory, and then control the servo electric cylinder 1301 to drive the throwing-width adjusting mechanism 1302, thus changing the inclination of the stalk throwing and guiding plate 1302-9, so as to achieve the self-adaptive adjustment of the full throwing width of the stalk remnant.

Figure 4:
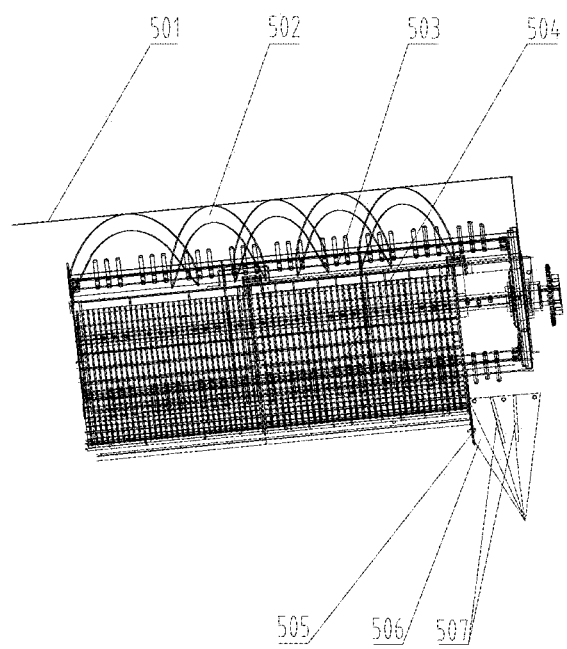
FIG. 4 is a schematic left side view of the structure of the longitudinal axials flow stalk discharging and guiding device.

As shown in FIG. 4, the longitudinal axial flow stalks discharging and guiding device 5 includes a longitudinal axial flow threshing cylinder 503, a longitudinal axial flow cylinder top cover 501, a longitudinal axial flow top cover stalk-guiding plate 502, a concave sieve 504, a stalk baffle 505, an arc stalk guiding plate 506, and a flow separating bar 507. The longitudinal axial flow cylinder top cover 501 is located above the longitudinal axial flow threshing cylinder 503. The longitudinal axial flow top cover stalk-guiding plate 502 is mounted on the inner wall of the longitudinal axial flow cylinder top cover 501, the bottom edge of the longitudinal axial flow top cover stalk-guiding plate 502 is located at a distance of 10 mm to 130 mm from the outermost edge of the longitudinal axial flow threshing cylinder 503. The concave sieve 504 is mounted below the longitudinal axial flow threshing cylinder 503. The center line of the concave sieve 504 coincides with the axis of the longitudinal axial flow threshing cylinder 503. The gap between the longitudinal axial flow threshing cylinder 503 and the concave sieve 504 is 10 mm to 60 mm, the stalk baffle 505 is attached to the tail of the concave sieve 504, and the width of the stalk discharging opening 6 formed by the stalk baffle 505 and the tail of the longitudinal axial flow threshing cylinder 503 is 200 mm to 400 mm. The arc stalk guiding plate 506 is mounted on the stalk baffle 505 and is located inside the stalk discharging opening 6, and the flow separating bar 507 is mounted on the arc stalk guiding plate 506. The stalk after the threshing process enters stalk discharging opening 6 under the action of the rotation of the longitudinal axial flow top cover stalk-guiding plate 502 and the longitudinal axial flow threshing cylinder 503, and then spread into three stalk strips under the action of the arc stalk guiding plate 506 and the flow separating diversion and shunt bars 507. The transverse width of the spread stalk strip is close to the lateral width of the inlet of the stalks remnant shredding device 11 so that the crushing capacity of the stalks remnant shredding device 11 is relatively uniform.

Figure 5:
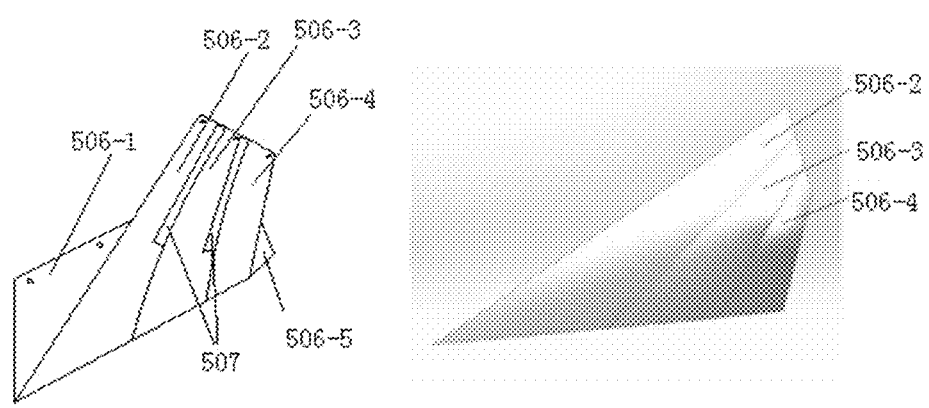
FIG. 5 is a schematic perspective view of the arc stalk guiding plate and the flow separating bar and a three-dimensional view of the three curved surface of the arc stalk guiding plate.

FIG. 5 shows a schematic perspective view of the arc stalk guiding plate and the flow separating bar. The arc stalk guiding plate 506 is an arc plate composed of two flat plates and three curved plates, the first plane 506-1 is fixed to the stalk baffle 505, the first curved surface 506-2, the second curved surface 506-3, the third curved surface 506-4 are arranged side by side and the sides are successively connected, and the two flow separating bars 507 are fixed to a junction between the first curved surface 506-2 and the second curved surface 506-3, and a junction between the second curved surface 506-3 and the third curved surface 506-4. The top ends of the first curved surface 506-2, the second curved surface 506-3, and the third curved surface 506-4 are in the same horizontal line and are fixed to the side wall of the stalk discharging opening 6; the tail end of the first curved surface 506-2, the second curved surface 506-3 and the third curved surface 506-4 are also in the same horizontal line and are connected to the leftmost side of the stalks remnant shredding device 11 and parallel to the transverse direction of the stalks remnant shredding device 11; the angle between the horizontal line in which the top ends of the three curved surface are located and the horizontal line in which the tail ends of the three curved surfaces is 90°. The second plane 506-5 is located behind and below the third curved surface 506-4. The lateral width formed by the trailing end of the second plane 506-5 and the tail ends of the three curved surfaces is approximately equal to the lateral width of the stalks remnant shredding 11. The arc stalk guiding plate 506 and the flow separating bar 507 serve to divert and diffuse the stem flow.

Figure 6:
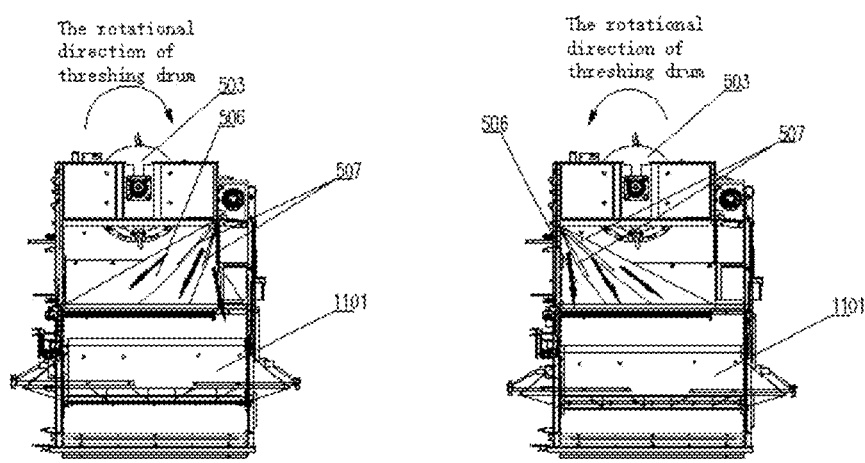
FIG. 6 is a schematic rear elevation view of the structure of the self-adaptive throwing device for stalks cutting and discharging in the longitudinal axial flow combine harvesters.

As shown in FIG. 6, the structure is a schematic rear elevation view of the structure of the self-adaptive throwing device for stalks cutting and discharging in the longitudinal axial flow combine harvesters. When viewed from the direction of the rear view, if the rotational direction of the longitudinal axial threshing cylinder 503 is clockwise, the stalks at the stalk discharging opening 6 are diffused from the upper right to the entire axial range of the shredder 1101 under the action of the diversion and diffusion of the arc stalk guiding plate 506 and the flow separating bar 507; if the longitudinal axial flow threshing cylinder 503 is rotated counterclockwise, the arc stalk guiding plate 506 may be modified slightly and the structure of the arc stalk guiding plate 506 is symmetrically inverted along the vertical center line of the longitudinal axial flow threshing cylinder 503 and the second plane 506-5 is removed, to achieve the purpose of diffusing the stalks at the stalk discharging opening 6 from the upper left to the entire axial range of the shredder 1101 under the action of the diversion and diffusion of the arc stalk guiding plate and the flow separating bar.

As shown in FIGS. 1 and 6, the stalks remnant device 11 comprises a shredder upper cover 7, a shredder 1101 and a shredder baseboard 12. The axis of the cutter shaft of the shredder 1101 is located at a distance of 0 mm to 200 mm below the upper sieve surface 9 of the cleaning device, and the horizontal distance between the cutter shaft of the shredder 1101 and the innermost side of the stalk discharging opening is 240 mm to 600 mm, an upper end of the shredder upper cover 7 is connected to the outermost side of the stalk discharging opening 6, and a lower end of the shredder upper cover 7 is connected to the shredder 1101; a stalk containing space of 0.25 m³ is formed among the shredder upper cover 7, the arc stalk guiding plate 506 and the shredder baseboard 12, to solve the problems such as unsmooth stalk discharging and blockage of the shredder 1101 caused by instantaneous too much stalk discharging of the longitudinal axial flow threshing cylinder 503. The shredder baseboard 12 is located at a distance of 0 mm to 130 mm below the upper sieve surface 9 of the cleaning device, the stalks passing through arc stalk guiding plate 506 and the flow separating bar 507 and the remnant discharged from the upper sieve surface 9 of the cleaning device can simultaneously enter into the space formed by the shredder upper cover 7, the arc stalk guiding plate 506 and the shredder baseboard 12; the stalks and the remnant are smashed under the cutting action of rotating blade and cutter stator. The stalks and the remnant after shredding action enter into the width adjustable throwing device 13 along the shredder baseboard 12, improving the crushing and throwing performance. At the same time, the air flow formed by the rotation of the blade of the shredder 1101 enhances the air flow velocity of the tail surface of the upper sieve surface 9 of the cleaning device, and facilitates the remnant discharge at the tail of the upper sieve surface 9, thereby improving the cleaning performance.

The embodiments are preferred embodiments of the present invention, but the invention is not limited to the embodiments described above, and any obvious modifications, substitutions, or variations that may be made by those skilled in the art without departing from the spirit of the invention are within the scope of the present invention.

We claim:

1. A self-adaptive throwing device for stalks cutting and discharging in the longitudinal axial flow combine harvesters, comprising a longitudinal axial flow stalk discharging and guiding device (5), a stalk remnant shredding device (11), a wind direction and wind speed detection device (4), a reaping region identification device (2), an operating speed sensor (8), a shredding revolution speed sensor (10), a width adjustable throwing device (13), a self-adaptive throwing real-time control system;

the stalk remnant shredding device (11) is located behind and below the longitudinal axial flow stalk discharging and guiding device (5), and the width adjustable throwing device (13) is mounted on a stalk discharging side behind the stalk remnant shredding device (11);

the wind direction and wind speed detection device (4) is installed in an intermediate area above a combine harvester grain tank (3), and the wind speed and the wind direction at the position where the machine works can be measured without being blocked by other components;

the reaping region identification device (2) is mounted above the combine harvester grain tank (3) and adjacent to the outside of the combine harvester grain tank (3), the detection range of reaping region identification device (2) is larger than the width of a header (1) of the combine harvester the operating speed sensor (8) is mounted on a driving wheel of the combine harvester;

the shredding revolution speed sensor (10) is mounted on a cutter shaft of the stalk remnant shredding device (11);

the width adjustable throwing device (13) includes a servo electric cylinder (1301) and a throwing-width adjusting mechanism (1302), the servo electric cylinder (1301) and the throwing-width adjusting mechanism (1302) are mounted on the outside of a throwing device housing (1302-10);

an input end of the servo electric cylinder (1301) is connected with the self-adaptive throwing real-time control system, and an output end of the servo electric cylinder (1301) is connected with the throwing-width adjusting mechanism (1302);

the throwing-width adjusting mechanism (1302) includes a STALK throwing and guiding plate (1302-9), a first connecting rod (1302-8), a second connecting rod (1302-3), a third connecting rod (1302-1), a middle connecting plate (1302-5), a supporting rod (1302-7), a first movable pin roll (1302-6), a second movable pin roll (1302-4), and a third movable pin roll (1302-2);

wherein, the stalk throwing and guiding plate (1302-9) is evenly distributed over the lateral width of the throwing device housing (1302-10) and a front end of the stalk throwing and guiding plate (1302-9) is rotatably connected with the throwing device housing (1302-10) and a rear end of the stalk throwing and guiding plate (1302-9) is rotatably connected with the first connecting rod (1302-8);

the first connecting rod (1302-8) is connected to the middle connecting plate (1302-5) by the first movable pin roll (1302-6), one end of the second connecting rod (1302-3) is connected to one end of the third connecting rod (1302-1) through the third movable pin roll (1302-2), and the other end of the second connecting rod (1302-3) is connected to the middle connecting plate (1302-5) through the second movable pin roll (1302-4), the other end of the third connecting rod (1302-1) is fixed to a rod-end joint in a shaft of the servo electric cylinder (1301), the middle connecting plate (1302-5) is mounted on the supporting rod (1302-7);

the supporting rod (1302-7) is an L-shaped rod, and the middle connecting plate (1302-5) is rotatable about an upper arm of the supporting rod (1302-7), and a lower arm of the supporting rod (1302-7) is fixed to a side of the throwing device housing (1302-10);

the wind direction and wind speed detection device (4) is used to detect the wind direction and the wind speed at the position where the machine works in real time and transmit the measured wind direction and the wind speed data to the self-adaptive throwing real-time control system;

the reaping region identification device (2) configured to: capture images larger than a width of the header (1) of the combine harvester; capture images continuously of both sides of the header (1) of the combine harvester in the advancing direction of the combine harvester; extract features from captured images comprising at least one of a first feature of upright standing and neatly arranged crops in the region waiting to be cut (201) or a feature of evenly distributed stalks on the low stubble in the region having been cut (202); determine that regions at the left side and the right side in the advancing direction of the combine harvester are the region waiting to be cut (201) or the region having been cut (202); convert the determination of the region waiting to be cut (201) or the region having been cut (202) into a control signal; and transmit the control signal to the self-adaptive throwing real-time control system;

the operating speed sensor (8) is used to measure the advancing speed of the machine in real time according to the rotational speed of the driving wheel of the combine harvester, and the operating speed parameters are transmitted to the self-adaptive throwing real-time control system;

the shredding revolution speed sensor (10) is used to measure the rotational speed of the cutter shaft of a shredder (1101), the throwing speed of short stalks is obtained, and the throwing speed parameter of short stalks is online transmitted to the self-adaptive throwing real-time control system;

the stalk remnant throwing angle is obtained in real time by conversion of the displacement of the servo electric cylinder;

the self-adaptive throwing real-time control system takes parameters including the wind direction value, the wind speed value, the working speed of machine and the throwing speed of short stalk, and stalk remnant throwing angle as the independent variables, to carry out the velocity synthesis of the throwing stalks remnant so as to obtain the velocity components of the stalks remnant in the width direction and the vertical direction, and the real-time throwing trajectory of the stalks remnant in the width section is obtained by combining with gravity;

the self-adaptive throwing real-time control system takes the advancing direction of the machine, the position parameters of the region waiting to be cut and the region having been cut as the independent variables so as to calculate the width required to throw the stalks remnant in real time; and according to the real-time throwing trajectory of the stalks remnant and the real-time throwing width required for the stalks remnant, the self-adaptive throwing real-time control system calculates the actual adjustment parameters of the servo electric cylinder (1301) by utilizing the fuzzy theory, and then control the servo electric cylinder (1301) to drive the throwing-width adjusting mechanism (1302), thus changing the inclination of the stalk throwing and guiding plate (1302-9), so as to achieve the full width throwing of the stalk remnant.

2. The self-adaptive throwing device for stalks cutting and discharging in the longitudinal axial flow combine harvesters according to claim 1, wherein the number of the throwing-width adjusting mechanism (1302) is 2 to 6, and the number of servo electric cylinder (1301) is 2 to 6, and the number of the stalk throwing and guiding plate (1302-9) included in each of the throwing-width adjusting mechanism (1302) is 1-3.

3. The self-adaptive throwing device for stalks cutting and discharging in the longitudinal axial flow combine harvesters according to claim 1, wherein the longitudinal axial flow stalk discharging and guiding device (5) comprises a longitudinal axial flow threshing cylinder (503), a longitudinal axial flow cylinder top cover (501), a longitudinal axial flow top cover stalk-guiding plate (502), a concave sieve (504), a stalk baffle (505), an arc stalk guiding plate (506), a plurality of flow separating bars (507), the longitudinal axial flow cylinder top cover (501) is located over the longitudinal axial flow threshing cylinder (503), the longitudinal axial flow top cover stalk-guiding plate (502) is mounted to the inner wall of the longitudinal axial flow cylinder top cover (501), and the bottom edge of longitudinal axial flow top cover stalk-guiding plate (502) is spaced from the outermost edge of the longitudinal axial flow threshing cylinder (503) by 10 mm to 130 mm, and concave sieve (504) is mounted below the longitudinal axial flow threshing cylinder (503);

a central axis of the concave sieve (504) coincides with an axis of the longitudinal axial flow threshing cylinder (503), and a gap between the longitudinal axial flow threshing cylinder (503) and the concave sieve (504) is 10 mm to 60 mm, and the stalk baffle (505) is mounted to a tail end of the concave sieve (504), the width of a stalk discharging opening (6) formed between the stalk baffle (505) and the tail end of longitudinal axial flow threshing cylinder (503) is 200 mm to 400 mm;

the arc stalk guiding plate (506) is located at the inner of the stalk discharging opening (6), the arc stalk guiding plate (506) is an arc plate composed of two flat plates and three curved plates; the first plane (506-1) is fixed on the stalk baffle (505), a first curved surface (506-2), a second curved surface (506-3) and a third curved surface (506-4) are arranged side by side, and the side edges are successively connected, and the two flow separating bars (507) are fixed to a junction between the first curved surface (506-2) and the second curved surface (506-3) and a junction between the second curved surface (506-3) and the third curved surface (506-4), respectively;

the top ends of the first curved surface (506-2), the second curved surface (506-3) and the third curved surface (506-4) are located in a first horizontal line and are fixed on the side wall of the stalk discharging opening (6), the tail ends of the first curved surface (506-2), the second curved surface (506-3) and the third curved surface (506-4) are located in a second horizontal line parallel to the transverse direction of the stalks remnant shredding device (11) and are connected to the leftmost side of the stalks remnant shredding device (11); the included angle between the first horizontal line in which the top ends of the three curved surfaces lies and the second horizontal line in which the tail ends of the three curved surfaces line lie is 90°; the second plane (506-5) is located behind and below the third curved surface (506-4), the transverse width formed by the tail end of the second plane (506-5) and the tail ends of the three curved surfaces approximately equals to the lateral width of stalks remnant shredding device (11).

4. The self-adaptive throwing device for stalks cutting and discharging in the longitudinal axial flow combine harvesters according to claim 1, wherein the number of the longitudinal axial flow top cover stalk-guiding plate (502) is 4-6, the longitudinal axial flow top cover stalk-guiding plate (502) is mounted towards the direction of the stalk discharging opening (6), and the mounting direction of the stalk discharging opening (6) is consistent with the flow direction of the stalks, a plane formed by connecting the head and tail of the longitudinal axial flow top cover stalk-guiding plate (502) is at an angle of 5° to 20° from the axis of the longitudinal axial flow threshing cylinder (503).

5. The self-adaptive throwing device for stalks cutting and discharging in the longitudinal axial flow combine harvesters according to claim 1, wherein the stalks remnant shredding device (11) includes a shredder upper cover (7), the shredder (1101), and a shredder baseboard (12);

the axis of the cutter shaft of the shredder (1101) is located at a distance of 0 mm to 200 mm below an upper sieve surface (9) of a cleaning device; and the horizontal distance between the cutter shaft of the shredder (1101) and the innermost side of the stalk discharging opening (6) is 240 mm to 600 mm, an upper end of the shredder upper cover (7) is connected with an outermost side of the stalk discharging opening (6), an lower end of the shredder upper cover (7) is connected with the shredder (1101), a stalk containing space of 0.25 m³ is formed among the shredder upper cover (7), the arc stalk guiding plate (506), and the shredder baseboard (12).

6. The self-adaptive throwing device for stalks cutting and discharging in the longitudinal axial flow combine harvesters according to claim 5, wherein the shredder baseboard (12) is located at a distance of 0 mm to 130 mm below the upper sieve surface (9) of the cleaning device.

7. The adaptive throwing real-time control method for the self-adaptive throwing device for stalks cutting and discharging in the longitudinal axial flow combine harvesters according to claim 1, wherein:

(1) during the operation of the combine harvesters, the adaptive throwing real-time control system obtains the wind direction value and the wind speed value at the position where the machine works through the wind direction and wind speed detection device (4), obtains the working speed of the machine through the operating speed sensor (8), obtains the short stalk throwing speed in real time through the shredding revolution speed sensor (10), obtains the stalk remnant throwing angle in real time by conversion of the displacement of the servo electric cylinder (1301) and obtains the information including the working direction of the machine, the position of the region waiting to be cut and the position of the region having been cut through the reaping region identification device (2), to characterize the operation status of the self-adaptive throwing device for stalks cutting and discharging;

(2) the obtained real-time parameters are preprocessed by the self-adaptive throwing real-time control system, the preprocessing process mainly includes suppressing the interference, improving the signal-to-noise ratio and completing the missing data to eliminate the influence of random and uncertain factors on the subsequent data analysis;

(3) the self-adaptive throwing real-time control system takes the parameters including the wind direction value, the wind speed value, the machine working speed, the short stalk throwing speed, and stalk remnant throwing angle as the independent variables to carry out the velocity synthesis of the throwing stalks remnant so as to obtain the velocity components of the stalks remnant in the width direction and the vertical direction, and the real-time throwing trajectory of the stalks remnant in the width section is obtained by combining with gravity; the self-adaptive throwing real-time control system takes the advancing direction of the machine, the position parameters of the region waiting to be cut and the region having been cut as the independent variables so as to calculate the width required to throw the stalks remnant in real time;

(4) according to the real-time throwing trajectory of the stalks remnant and the real-time throwing width required for the stalks remnant, the self-adaptive throwing real-time control system calculates the actual adjustment parameters of the servo electric cylinder (1301) by utilizing the fuzzy theory, and then control the servo electric cylinder (1301) to drive the throwing-width adjusting mechanism (1302), thus changing the inclination of the stalk throwing and guiding plate (1302-9), so as to achieve the full width throwing of the stalk remnant.

\* \* \* \* \*